Aug. 7, 1928.
1,680,129
H. W. BROWN
AUTOMATIC RECLOSING CIRCUIT BREAKER SYSTEM
Filed Dec. 17, 1924
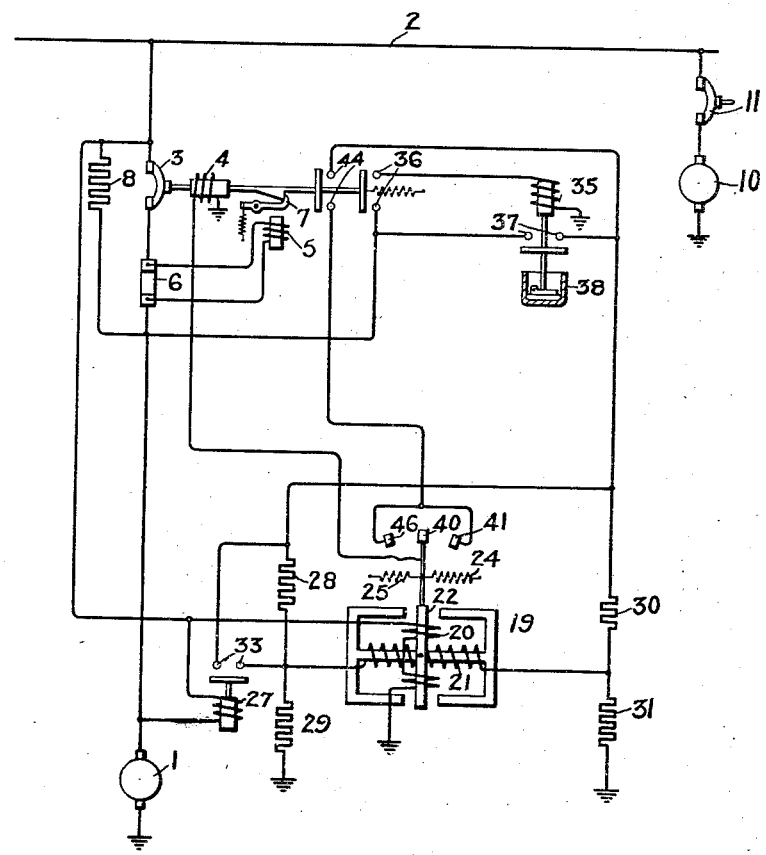
Inventor:
Harold W. Brown;
by
His Attorney.

Patented Aug. 7, 1928.

1,680,129

UNITED STATES PATENT OFFICE.

HAROLD W. BROWN, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed December 17, 1924. Serial No. 756,607.

My invention relates to automatic reclosing circuit breaker systems and particularly to such systems in which a circuit breaker is arranged automatically to connect a source of current to a load circuit as soon as the load is such that the circuit breaker can be reclosed without overloading the source.

It is well known to those skilled in the art that in systems in which the load circuit is arranged to be supplied with current at a plurality of points, it is necessary to arrange an automatic reclosing circuit breaker system so that it will function properly under two different conditions of the load circuit. One of these conditions, called the stub end feed condition, is when all the circuit breakers connecting other sources to the load circuit are open, and the other condition, called the multiple feed condition, is when one or more of the other circuit breakers are closed so that the load circuit is energized at substantially normal potential at some other point.

One object of my invention is to provide an improved automatic reclosing circuit breaker system which will function properly under both of the above mentioned conditions of the load circuit.

In accordance with my invention I provide a single reclosing relay having a magnetizing winding connected to a suitable source of current and an operating winding connected so that the energization thereof varies in accordance with the condition of the load circuit in response to which it is desired to control the reclosing of the circuit breaker, and means for varying the connections of one of the windings of said relay to change the setting thereof so that it will operate properly to control the closing of the circuit breaker under both of the above mentioned conditions of the load circuit.

My invention will be better understood from the following description when taken in connection with the accompanying drawing, which shows one embodiment of my invention, and its scope will be pointed out in the appended claims.

Referring to the drawing, 1 represents a source of current, shown as a direct current generator, which is arranged to be connected to a load circuit 2 by means of a circuit breaker 3 which may be of any suitable type. In order to simplify the drawing it is assumed that the ground is one side of load circuit. One terminal of the generator 1 is shown directly connected to the ground and the circuit breaker 3 is arranged to connect the other terminal to the metallic conductor of the load circuit. It is evident however that my invention is neither limited to a grounded system nor to having the circuit breaker 3 control the connection between only one terminal of the generator and the corresponding side of the load circuit.

As shown in the drawing, the circuit breaker 3 is of the well known latched-in type, having a closing coil 4, which, when energized, closes the circuit breaker, and an overload trip coil 5 which is connected to a resistance shunt 6 in the main circuit of the generator 1 and which releases the latch 7, that holds the circuit breaker in its closed position, when the current supplied by the generator 1 exceeds a predetermined value.

In order to control the reclosing of the circuit breaker 3, in accordance with the load connected to the load circuit when the circuit breaker 3 is open, a resistor 8 of relatively high resistance is connected in shunt around the main terminals of the circuit breaker. Therefore when the circuit breaker 3 opens, the short circuit around the resistor 8 is opened and the current supplied by the source is reduced to a very small value. The value of this small feeling out current is dependent upon the load connected to the load circuit and also upon whether the load is being directly supplied at some other point by some other source such as generator 10 which may be connected to the load circuit by means of a circuit breaker 11. It is evident that under stub end feed condition, that is, when both of the circuit breakers 3 and 11 are open, the feeling out current through the resistor 8 produces a voltage across the load circuit which varies with the resistance of load connected to the load circuit. Under such conditions, it is old in the art to provide a relay which operates in response to a predetermined voltage across the load circuit to effect the closing of the circuit breaker. When, however, the circuit breaker 11 is closed and the circuit breaker 3 is open, the voltage across the load circuit for a given load resistance is very much higher than when the load circuit is only supplied through the current limiting resistor 8. Therefore any reclosing relay which is adjusted to operate at the proper voltage under the stub end feed condition operates to effect the reclosing of the circuit breaker before the load has reduced to the proper value under the multiple feed condition. In order to overcome this difficulty it has been the practice to provide another reclosing relay which is arranged to control the closing of the circuit breaker in response to a different value of voltage or some other characteristic of the load circuit under the multiple feed condition, and have a selective relay arranged to transfer the control of the reclosing of the circuit breaker from one reclosing relay to the other in accordance with the condition of the load circuit.

In accordance with my invention, I provide a single reclosing relay 19 which is arranged to function properly under both of the above mentioned conditions of the load circuit. As shown in the drawing, this relay 19 is of the directional type having an operating winding 20, a magnetizing winding 21 and a movable armature 22 which is arranged to be moved in opposite directions from a normal position in accordance with the relative directions of the currents in the two windings of the relay. The relay 19 is constructed in any well known manner so that a predetermined voltage has to be impressed upon the operating winding 20 to move the armature 22 in one direction and a much higher voltage has to be impressed upon the operating winding to move the armature in the opposite direction. This result is obtained in the arrangement diagrammatically shown in the drawing by opposing the movements of the armature in the respective directions by the centering springs 24 and 25 which are adjusted for different values. In my copending application, Serial No. 482,630, filed July 5, 1921, and assigned to the same assignee as this application, I have described and claimed a preferred type of relay and also an arrangement for connecting the springs 24 and 25 to the movable armature 22 so that the restraining forces in the two directions are different and may be independently adjusted.

As shown in the drawing the operating winding 20 is connected across the load circuit so that the relay operates in response to the voltage across the load circuit. In order that the setting of the relay may be changed in accordance with the conditions of the load circuit, so that the voltage across the load circuit required to operate the reclosing relay under the stub end feed condition is lower than the voltage required under the multiple feed condition, I provide an arrangement whereby the current flows through the magnetizing winding in one direction under the stub end feed condition and in the opposite direction under the multiple feed condition. This reversal of current through the magnetizing winding is produced by connecting the winding 21 as the center arm of a Wheatstone bridge which is formed by the four resistors 28, 29, 30 and 31 and which is connected across the source after the circuit breaker opens, and arranging a selective relay 27 to short circuit the resistor 28 when the voltage across the load indicating resistor 8 is above a predetermined value which indicates that no other source is connected to the load circuit. The resistors 28, 29, 30 and 31 are arranged so that the ratio of the resistance of the resistor 28 to the resistance of the resistor 29 is greater than the ratio of the resistance of the resistor 30 to the resistance of the resistor 31. Therefore when the contacts 33 of the relay 27 are open some of the current that flows through the resistor 30 flows through the magnetizing winding 21 and the resistor 29, whereas when the resistor 28 is short circuited by the contacts 33 of the selective relay, the current flows through the magnetizing winding in the opposite direction. It is evident that if it were so desired, the resistor 28 could be made infinity, in which case only the three infinite resistors 29, 30 and 31 would be required.

The windings 20 and 21 and restraining springs 24 and 25 are so arranged that when the resistor 28 is short circuited by the contacts 33, the direction of circuit through the magnetizing winding is such that the movement of the armature 22 is opposed by the weaker spring.

In order to prevent the circuit breaker 3 from reclosing before the conditions on the load circuit have reached a stable condition after the circuit breaker opens, a time relay 35 is provided which is arranged to prevent the reclosing relay from operating until after the circuit breaker has been open for a certain length of time.

The operation of the system shown is as follows: When the circuit breaker 3 is closed and the load conditions are normal, the circuit breaker is held in its closed position by the latch 7. Under such conditions the current limiting resistor 8 and the selective relay 27 are short circuited and the circuit of the time relay 35 is open at the auxiliary contacts 36 on the circuit breaker 3. The circuit through the Wheatstone bridge is open at the contacts 37 of the time relay 35 so that the movable contact 40 carried by the armature 22 is in the position shown since it is necessary to have both windings of the relay 19 energized in order to maintain the armature in either of its circuit closing positions.

Upon the occurrence of an overload on the load circuit, the overload trip coil 5 is sufficiently energized to release the latch 7 so that the circuit breaker 3 opens. When the circuit breaker opens, the short circuit around the resistor 8 is removed so that the current supplied by the source 1 is reduced to a very small value. This very small current produces a voltage drop across the resistor which is an indication of the load condition and by means of the relay 27 is used to determine whether or not another source is connected to the load circuit when the circuit breaker 3 is open.

The closing of the auxiliary contact 36 on the circuit breaker 3, when it opens, connects the coil of the time relay 35 across the source 1. After a predetermined time determined by the setting of the dashpot 38, the time relay 35 closes its contacts 37 and connects the Wheatstone bridge across the source 1.

If the load circuit is not supplied by some other source, the voltage drop impressed upon the coil of the relay 27 is sufficient to cause the relay to operate and close its contacts 33, thereby short circuiting the resistor 28. Therefore when the time relay 35 closes its contacts 37, current flows through the magnetizing winding in such a direction that the movement of the armature 22 is opposed by the weaker spring which it will be assumed is 25. Under these conditions, the flux produced by winding 20 tends to move the armature 22 so that the contact 40 carried by the armature 22 engages the contact 41. As soon as the load resistance reaches a predetermined value, the voltage across the load circuit becomes sufficient to cause the armature to move from its middle position and connect together the contacts 40 and 41. The closing of these contacts completes a circuit for the closing coil 4 to close the circuit breaker 3. This circuit is from the ungrounded terminal of the source 1 through the contacts 37 of the time relay 35, auxiliary contacts 44 on the circuit breaker 3, contacts 40 and 41 of the reclosing relay 19, closing coil 4 to the ground. The opening of the auxiliary contacts 36 on the circuit breaker when it closes, deenergizes the time relay 35 which, in turn, disconnects the Wheatstone bridge from the source 1 so that the magnetizing winding 21 is deenergized. Reclosing relay 19, therefore, is restored to its normal position.

If the load circuit is supplied from some other source, such as the source 10, after the circuit breaker 3 opens, the voltage impressed upon the coil of the relay 27 is not sufficient to cause the relay to short circuit the resistor 28. Therefore when the time relay 35 closes its contacts 37 to connect the Wheatstone bridge across the source 1, the direction of current through the magnetizing winding is in the opposite direction from what it is under its stub end feed condition. Therefore the operating winding 20 tends to move the armature 22 in a direction to close the contacts 40 and 46. Since the movement of the armature in this direction is opposed by the stronger spring 24, the relay 19 does not close its contacts 40 and 46 until the voltage across the load circuit reaches a higher predetermined value than is required under the stub end feed conditions. When the load circuit voltage reaches this higher predetermined voltage, the contacts 40 and 46 are closed and the circuit of the closing coil 4 is completed to close the circuit breaker 3. This circuit is the same as the one above described except it includes the contacts 40 and 46 instead of the contacts 40 and 41.

While I have shown and described one particular arrangement for controlling the connections of a reclosing relay in accordance with the load conditions so as to change the setting thereof, it will be obvious to those skilled in the art that various modifications may be made therein without departing from the spirit and scope of my invention. Therefore, I do not desire to be limited to the exact arrangement shown and described, but seek to cover in the appended claims all those modifications that fall within the true spirit and scope of my invention.

What I claim as new and desire to secure by Letters Patent of the United States, is:

1. In an automatic reclosing circuit breaker system, the combination with a source of current, a load circuit arranged to be supplied with current at a plurality of points, a circuit breaker arranged to connect said source to said load circuit, and closing means for said circuit breaker, of a polarized relay for controlling the operation of said closing means having an operating winding connected so that the energization thereof varies with the load connected to the load circuit when said circuit breaker is open, and means whereby said relay controls the operation of said closing means in response to different conditions of the load circuit comprising means operative in response to a predetermined condition of said load circuit to vary the polarization of said relay.

2. In an automatic reclosing circuit breaker system, the combination with a source of current, a load circuit arranged to be supplied with current at a plurality of points, a circuit breaker arranged to connect said source to said load circuit, current limiting means arranged to be connected in series with said source and said load circuit when said circuit breaker is open, and closing means for said circuit breaker, of a polarized relay for controlling the operation of said closing means having an operating winding connected so as to be responsive to the voltage across said load circuit, and means operative in response to a predetermined condition of said load circuit to vary the polarization of said relay to cause said relay to operate in response to a different voltage of the load circuit to effect the closing of said circuit breaker.

3. In an automatic reclosing circuit breaker system, the combination with a source of current, a load circuit arranged to be supplied with current at a plurality of points, a circuit breaker arranged to connect said source to said load circuit, current limiting means arranged to be connected in series with said source and said load circuit when said circuit breaker is open, and closing means for said circuit breaker, of a relay for controlling the operation of said closing means having an operating winding connected so as to be responsive to the voltage across said load circuit and a magnetizing winding connected to said source, and means operative when said circuit breaker is open and said load circuit is supplied with current at some other point to change the connection of said magnetizing winding whereby a voltage higher than the one required when said load circuit is not supplied at some other point has to be impressed across said operating winding to cause said relay to effect the operation of said closing means.

4. In an automatic reclosing circuit breaker system, the combination with a source of current, a load circuit arranged to be supplied with current at a plurality of points, a circuit breaker arranged to connect said source to said load circuit, current limiting means arranged to be connected in series with said source and said load circuit when said circuit breaker is open, and closing means for said circuit breaker, of a directional relay for controlling said closing means, said relay having a movable member arranged to be moved in opposite directions from a given position to effect the operation of said closing means, restraining means for opposing the movement of said movable member in each direction, said restraining means being adjustable to exert a greater opposing force in one direction than in the other, an operating winding for said relay connected across said load circuit, a magnetizing winding for said relay, and means operative in response to a predetermined condition of said load circuit to change the connections of one of said windings to reverse the direction of flow of current therein.

5. In an automatic reclosing circuit breaker system, the combination with a source of current, a distribution circuit arranged to be supplied with current at a plurality of points, a circuit controlling device arranged to connect said source to said load circuit, means for effecting the opening of said circuit controlling device upon the occurrence of a predetermined abnormal load condition, current limiting means arranged to be connected between said source and said load circuit when said circuit breaker is open, and closing means for said circuit breaker, of a directional relay for controlling said closing means, said relay having a movable member arranged to be operated in two different manners to effect the operation of said closing means, restraining means for opposing the movement of said movable member in each manner, an operating winding for said relay connected across said load circuit, a magnetizing winding for said relay connected to said supply circuit, and means operative when said circuit breaker is open and said load circuit is supplied with current at some other point to change the connections of said magnetizing winding to said source whereby the flow of current through said magnetizing winding is changed.

6. In an automatic reclosing circuit breaker system, the combination with a source of current, a load circuit arranged to be supplied with current at a plurality of points, a circuit breaker arranged to connect said source to said load circuit, means for effecting the opening of said circuit breaker upon the occurrence of a predetermined abnormal load condition, current limiting means arranged to be connected in series with said source and said load circuit when said circuit breaker is open, and closing means for said circuit breaker, of a relay for controlling said closing means comprising a movable armature, a magnetizing winding, a second winding connected across said load circuit and adapted to actuate said armature in one direction or the other depending upon the direction of flow of current through said magnetizing winding, means opposing movement of said member in either direction, said last mentioned means being arranged to exert a greater opposition in one direction than in the other, a plurality of resistors connected to form a Wheatstone bridge connection, said magnetizing winding being connected across the central leg of the bridge formed by said resistors, and means operative when said circuit breaker is open and said load circuit is supplied with current at some other point to vary the resistance of one of the arms of the Wheatstone bridge whereby the direction of current through said magnetizing winding is reversed.

7. In an automatic reclosing circuit breaker system wherein a circuit breaker is arranged to connect a source of current to a load circuit under stub end feed and multiple feed conditions thereof, the combination of a polarized relay for controlling the reclosing of the circuit breaker in response to the load condition of said load circuit, and means for polarizing said relay in one direction for the stub end feed condition of said load circuit and in the opposite direction for the multiple feed condition of said load circuit.

In witness whereof, I have hereunto set my hand this 16th day of December, 1924.

HAROLD W. BROWN.

CERTIFICATE OF CORRECTION.

Patent No. 1,680,129.　　　　　　　　　　　　Granted August 7, 1928, to

HAROLD W. BROWN.

It is hereby certified that error appears in the printed specification of the above numbered patent requiring correction as follows: Page 2, line 104, for the word "infinite" read "finite"; page 3, line 31, strike out the word "drop"; and that the said Letters Patent should be read with these corrections therein that the same may conform to the record of the case in the Patent Office.

Signed and sealed this 11th day of September, A. D. 1928.

M. J. Moore,
Acting Commissioner of Patents.

(Seal)